US008317900B2

(12) United States Patent
Peinemann et al.

(10) Patent No.: US 8,317,900 B2
(45) Date of Patent: Nov. 27, 2012

(54) POLYMER MEMBRANE

(75) Inventors: Klaus-Viktor Peinemann, Geeshacht (DE); Grete Johannsen, Honstorf (DE); Wilfredo Yave Rios, Weil am Rhein (DE); Anja Car, Selnica OB Dravi (SI)

(73) Assignee: Helmholtz-Zentrum Geesthacht Zentrum fur Material-und Kustenforschung GmbH, Geesthacht (DE)

( * ) Notice: Subject to any disclaimer, the term of this patent is extended or adjusted under 35 U.S.C. 154(b) by 0 days.

(21) Appl. No.: 12/975,842

(22) Filed: Dec. 22, 2010

(65) Prior Publication Data

US 2011/0120304 A1 May 26, 2011

Related U.S. Application Data

(63) Continuation of application No. PCT/EP2009/004224, filed on Jun. 12, 2009.

(30) Foreign Application Priority Data

Jun. 25, 2008 (DE) .......................... 10 2008 029 830

(51) Int. Cl.
*B01D 53/22* (2006.01)
*B01D 71/06* (2006.01)

(52) U.S. Cl. ............... 95/45; 95/51; 96/4; 96/11; 96/12; 96/13; 96/14; 568/623; 264/212

(58) Field of Classification Search .................. 96/4, 11, 96/12, 13, 14; 95/45, 51; 210/500.27, 500.37; 264/212; 568/623
See application file for complete search history.

(56) References Cited

U.S. PATENT DOCUMENTS

| 4,900,449 | A |   | 2/1990 | Kraus et al. |
|-----------|---|---|--------|-------------|
| 4,963,165 | A |   | 10/1990 | Blume et al. |
| 5,163,977 | A | * | 11/1992 | Jensvold et al. ................... 95/45 |
| 5,445,669 | A | * | 8/1995 | Nakabayashi et al. ............. 95/51 |
| 5,795,920 | A | * | 8/1998 | Kang et al. ............... 210/500.39 |
| 5,936,004 | A | * | 8/1999 | Altmeier ......................... 521/32 |
| 2010/0024651 | A1 | * | 2/2010 | Bansal .............................. 96/11 |

FOREIGN PATENT DOCUMENTS

| EP | 0761291 | 3/1997 |
| WO | WO9303821 | 3/1993 |

OTHER PUBLICATIONS

Anja Car, et al., PEG modified poly(amide-b-ethylene oxide) membranes for CO2 separation, Journal of Membrane Science 307 (2008) 88-95, ScienceDirect.
Henni et al., Solubilities of Carbon Dioxide in polyethylene Glycol Ethers, The Canadian Journal of Chemical Engineering, vol. 83, Apr. 2005.

* cited by examiner

*Primary Examiner* — Jason M Greene
(74) *Attorney, Agent, or Firm* — Michaud-Kinney Group LLP

(57) ABSTRACT

The invention relates to a method for producing membrane, in particular gas separation membrane, wherein the membrane comprises a selective separating layer. The following steps are carried out: a) a polymer solution is produced from at least one polymer and at least one polyglycol ether, b) the polymer solution is cast into a film, c) in a further step, the selective separating layer is produced from the film, preferably by drying. The invention, among other things, further relates to a membrane, in particular gas separation membrane, comprising a selective separating layer.

17 Claims, No Drawings

POLYMER MEMBRANE

CROSS REFERENCE TO RELATED APPLICATION

This application is a continuation of and claims priority to International Patent Application No. PCT/EP2009/004224 filed on Jun. 12, 2009, which claims priority to German Patent Application No. 10 2008 029 830.1 filed on Jun. 25, 2008, subject matter of these patent documents is incorporated by reference herein in its entirety

FIELD OF THE INVENTION

The invention concerns a method for producing a membrane, in particular a gas separation membrane, wherein the membrane comprises a selective separating layer and a membrane, in particular a gas separation membrane that comprises a selective separating layer.

BACKGROUND

Technically applied polymer membranes for gas separation are usually composite membranes that consist of a porous substructure and pore-free, dense polymer film. For this purpose a composite membrane is utilized or the composite membrane encompasses a corresponding composite material. It is important for the technical usability to achieve high gas flows per area in order to keep the membrane surfaces and the energy costs low. The potential selectivity and gas flow are given by the polymer characteristics. Proportional to increasing layer thickness the flow falls off and the selectivity remains essentially the same. It therefore depends on providing suitable materials and to process these into the smallest layer thicknesses into composite membranes or integrally asymmetric membranes.

The polymer materials available for the manufacture of a separative-selective layer of the composite membranes can be divided into elastomers and glassy polymers that distinguish themselves through the location of the glass transition temperature above or below room temperature. Both polymers are suitable for gas separation. Optimized, technically applied membranes are usually deployed with layer thicknesses of the separative-active layer of 0.5 to 1 μm.

Moreover, the separation of polar gases from non-polar gases or gas mixtures is important in numerous industrial processes, such as, for example, the separation of acidic gases such as carbon dioxide ($CO_2$) or hydrogen sulfide ($H_2S$). For example, the separation of $CO_2$ from natural gas is important in the petrochemical industry since $CO_2$ is present at high concentrations in many natural gas reserves. Especially, carbon dioxide in combination with water is corrosive and can therefore destroy pipelines or other equipment. Furthermore, the presence of carbon dioxide reduces the heating value of natural gas.

For the separation of carbon dioxide from natural gas membrane installations have been used to selectively remove carbon dioxide from gas flows or gas mixtures. In Quadripu, Pakistan, for example, a membrane installation wherein about 14 mio. $m^3$ of natural gas are cleaned per day using asymmetric cellulose acetate membranes. The carbon dioxide flows through the cellulose acetate membrane at a rate of approximately 0.2 $m^3/(m^2$ h bar). The selectivity relative to methane is between 15 to 20, the selectivity of the cellulose acetate membrane relative to nitrogen is slightly higher.

For many applications which high pressure is not available the gas flow through a cellulose acetate membrane is too small, so that the required membrane surfaces are very large.

A second important polymer class for membranes for carbon dioxide separation is polyimides. The commercial available Matrimid is an example of this. Known polyimide membranes are produced or distributed for example by UBE in Japan and Air Products in U.S.A. The selectivity of polyimide membranes is higher than the selectivity of cellulose acetate membranes (about 35 to 50 for carbon dioxide/nitrogen), where the flow for polyimide-membranes is similar.

In table 1 membrane materials are listed that are well suitable for carbon dioxide separation from gas mixtures.

| Polymer | Permeability selectivity of $CO_2$/ [Barrer] | Selectivity α | | |
|---|---|---|---|---|
| | | $CO_2/N_2$ | $CO_2/CH_4$ | $CO_2/H_2$ |
| PDMS | 3070 | 9.6 | 3.8 | 4.3 |
| Pebax ® 2533 | 221 | 23 | | 3.7 |
| Pebax ® 4011 (now Pebax ® 1657) | 78 | 60 | 15 | 7.8 |
| Matrimid | 10.7 | 33 | 42 | 0.38 |
| Cellulose acetate | 6.3 | 30 | 30 | 2.4 |

Permeability in Barrer (1 Barrer = $10^{-10}$ $cm^3$(STP) cm/($cm^2$ s cmHg);
(PDMS = Polydi-methyl siloxane)

Table 1 Membrane Materials for Carbon Dioxide Separation

In the case of the polymer listed in table 1 under the label Pebax® (by ARKEMA) it concerns a commercially available multi-block copolymer whose blocks contain polyethylene oxide and Nylon (polyamide). Pebax® MH1657 consists of 60 wt % PEO (polyethylene oxide) and 40 wt % Nylon (PA 6).

Furthermore, it can be gathered from table 1 that for carbon dioxide a membrane made of Pebax® has a significantly higher permeability than a membrane of cellulose acetate or polyimide or Matrimid.

Moreover, U.S. Pat. No. 4,963,265 discloses the manufacture of a composite membrane from Pebax®, wherein the therein described composite membrane has a three times higher flow than the above named membranes.

Further, it has been shown in a scientific presentation, PEG modified poly(amide-b-ethylene oxide) membranes for $CO_2$ separation" (Journal of Membrane Science 307 (2008), 88-95) that the permeability of carbon dioxide can be significantly increased if polyethylene glycol (PEG) is admixed to a membrane polymer made of Pebax®.

In table 2 the properties of Pebax® as well as Pebax®/PEG mixtures are presented.

TABLE 2

$CO_2$ permeability and selectivity of Pebax ® MH1657 and mixtures with PEG (polyethylene glycol), measured at 30° C. (comparative data from Journal of Membrane Science 307 (2008), 88-95)

| Sample | $^aP$ $CO_2$ | | $^bD$ $CO_2$ | $^cS$ $CO_2$ | α $CO_2/H_2$ | α $CO_2/N_2$ | α $CO_2/CH_4$ |
|---|---|---|---|---|---|---|---|
| Pebax ® | 24.8 | (73) | 4.6 | 5.3 | 9.1 | 45 | 15.6 |
| Pebax ®/PEG10 | 25.6 | (75) | 4.9 | 5.2 | 9.2 | 47 | 15.8 |
| Pebax ®/PEG20 | 27.2 | (80) | 5.1 | 5.4 | 9.2 | 45 | 15.9 |
| Pebax ®/PEG30 | 35.8 | (105) | 6.2 | 5.8 | 9.6 | 43 | 15.1 |

TABLE 2-continued

CO$_2$ permeability and selectivity of Pebax ® MH1657 and mixtures with PEG (polyethylene glycol), measured at 30° C. (comparative data from Journal of Membrane Science 307 (2008), 88-95)

| Sample | $^a$P CO$_2$ | $^b$D CO$_2$ | $^c$S CO$_2$ | α CO$_2$/H$_2$ | α CO$_2$/N$_2$ | α CO$_2$/CH$_4$ |
|---|---|---|---|---|---|---|
| Pebax ®/PEG40 | 44.9 | (132) | 8.0 | 5.6 | 10.0 | 44 | 15.1 |
| Pebax ®/PEG50 | 51.3 | (151) | 9.6 | 5.3 | 10.8 | 47 | 15.5 |

$^a$Permeability coefficient P in [10$^{-15}$ mol m/(m$^2$ s Pa)], (Barrer)
$^b$Diffusion coefficient D in [10$^{-11}$ (m$^2$/s)]
$^c$Solubility coefficient S in [10$^{-4}$ mol (STP)/(m$^3$ Pa)]

The values indicated behind PEG in table 2, provide respectively, the weight % of PEG (polyethylene glycol) in the corresponding mixture.

It is one object of the invention to provide a better membrane for the separation of, in particular polar, gases from gas mixtures that exhibit in contrast to the polymer membranes known so far a higher permeability, preferably in regard to carbon dioxide

SUMMARY

The present invention resides in one aspect in a method for manufacturing a gas separation membrane, wherein the membrane comprises a selective separating layer with the following steps:
  a) polymer solution is produced from at least one polymer and at least one polyglycol ether,
  b) the polymer solution is cast into a film
  c) in a further step the selective separating layer is produced from the film, preferably by drying.

By the use of polyglycol ether or etherified polyethylene glycol and polyether-polyamide block copolymers (as second polymer of the polymer solution), which are known for example under the label Pebax®, stable, homogeneous mixtures or polymer solutions are provided from which a polymer membrane or a selective separating layer of membrane, in particular a composite membrane, is manufactured.

In this context it has turned out that Pebax®/polyethylene glycol ether mixtures are produced into polymer membranes that feature an increased permeability, for example, in regard to carbon dioxide relative to the previously known polymer membranes on the basis of Pebax®. Hereby, the polymer solutions or polymer mixtures (according to prior art) are not manufactured with polyethylene glycol but according to the invention with the ethers of polyethylene glycol or with polyglycol ethers.

In particular oligomer, etherified polyethylene glycols are utilized that can feature 2 to 8 ethylene glycol units. Hereby the terminal OH-groups are etherified, wherein the ether group can consist of linear or branched alkyl groups with 1 to 6 carbon atoms.

By means of the use of etherified polyethylene glycol in the polymer membranes the penetrability of this membrane or of the selective separating layer is increased for carbon dioxide in a significant manner. The selectivity relative to other gases remains constant or increases, for example in the case of carbon dioxide/hydrogen separation.

According to an embodiment of the present invention, a, preferably supported, composite membrane or polymer membrane is provided with a selective separating layer, wherein on a, in particular porous, membrane support the selective separating layer, consisting or manufactured from the liquid polymer solution of ethers of the polyethylene glycol and polyether-polyamide block-copolymers (for example Pebax®), is or is being applied.

Accordingly, in an embodiment of the present invention, it is provided that a thermoplastic elastomer, in particular a polyether block amide, is utilized as a polymer for the polymer solution (according to the method step a)). As a polyether block amide, a polyether-polyamide block-copolymer, or polyether block polyamide is known as Pebax®. This polymer consists primarily of recurring units of the following general formula:

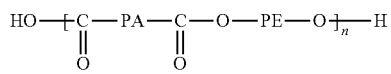

wherein PA stands for a polyamide segment, in particular a linear saturated aliphatic polyamide sequence, and PE stands for a polyether segment and n for a positive integer. Typically, the pure Pebax® MH 1657 has a carbon dioxide permeability of 78 Barrer and a carbon dioxide/hydrogen selectivity of 9.1 at 30° C.

When using dimethyl polyglycolether with a proportion of 50 wt % in a polymer solution or polymer mixture, out of which the polymer membrane or separative-selective layer is manufactured, is has been found that the carbon dioxide permeability increases to 606 Barrer and the selectivity relative to hydrogen to 10.1. Due to the fact that the flow in the case of the membrane according to the present invention is increased, the membrane surface that is required for technical separation processes is correspondingly reduced by a factor of about 3 and more. In some separation processes the membrane surface is reduced by a factor of 5 to 10, in particular about a factor of 7 to 8.

In an embodiment of the present invention the manufacture of the polymer solution is implemented in a, in particular liquid, solvent. In particular, the polymer solution is manufactured in an ethanol/water mixture since in this binary solvent mixture of ethanol and water, for example in a mixing ratio of 70 wt % ethanol, 30 wt % water, Pebax® as well as dipolyglycol ether are admixed easily. An additional advantage of this solution is the stability of the polymer solution at room temperature, whereby the membrane manufacturing process is facilitated.

Preferably, after the polymer solution and the solvent are mixed, the mixture is cast into a film. Subsequently, the film is dried, for example, by means of an air current, so that a selective separating layer of a membrane according is obtained.

For the manufacture of a composite membrane the film is poured onto a membrane support or a support membrane and thereafter dried to a selective separating layer. Alternatively, the selective separating layer is disposed on or in the membrane support or the support membrane.

The composite membrane is assembled from a per se known porous support membrane or a membrane support onto which the selective separating layer is applied on the basis of a cross-linked polyvinyl alcohol.

The per se known porous support membrane can consist of polyacryl nitride (PAN), polyamide imide, polyether imide, polyether sulfone, and other membrane-forming polymers. Also inorganic membranes or inorganic-organic blend membranes are suitable as support. The membranes according to the present invention can be applied as flat membranes as well as hollow fiber membranes.

The utilized porous support membranes should have a narrow pore radius distribution and such an average pore radius that the molecules of the coating solvent cannot penetrate into the pores of the porous support membrane.

According to an embodiment of the present invention, it is furthermore an advantage if the polymer solution, in particular in the method step a), is manufactured at a temperature between 50° C. to 90° C., and in particular between 70° C. to 80° C.

In addition, a suitable polyglycol ether for the manufacture of the polymer solution (in method step a)) is polyethylene glycol methyl ether, polyethylene glycol-dimethyl ether, polyethylene glycol-vinyl ether, polyethylene glycol-divinyl ether, polyethylene glycol-allyl methyl ether, polyethylene butyl ether, polyethylene glycol-dibutyl ether or mixtures thereof.

Preferably polyglycol ether is added at a proportion of about 5 wt % to 60 wt %, preferably up to about 50 wt %, of the polymer solution, in reference to the mixture with the second polymer, for example Pebax®. Thereby a stable selective separating layer is achieved.

Beyond that, in an embodiment of the method the film or the selective separating layer is applied on a, preferably porous, support or membrane support.

Furthermore, the present invention also resides in a membrane, in particular a gas separation membrane that comprises a selective separating layer that is preferably obtainable or is being manufactured by means of the implementation of the previously described method steps, wherein the membrane is characterized in that the selective separating layer consists of or is being manufactured from at least one polymer, in particular a thermoplastic elastomer, preferably a polyether block amide, and at least one polyglycol ether.

In a further improvement the separative-selective layer can furthermore be deposited on a semi-porous or porous support membrane.

Beyond that it is advantageous if the at least one polyglycol ether for the manufacture of the separative-selective layer is a polyethylene glycol methyl ether, polyethylene glycol-dimethyl ether, polyethylene glycol-vinyl ether, polyethylene glycol-divinyl ether, polyethylene glycol-allyl methyl ether, polyethylene butyl ether, polyethylene glycol-dibutyl ether or mixture thereof.

In particular, in the case of the membrane the proportion of the polyglycol ethers for the manufacture of the selective separating layer is between 5 wt % to 60 wt %, preferably to 50 wt %.

In addition, it is preferred if the selective separating layer is or is being disposed on a, in particular porous, support.

Furthermore, the problem is solved through the utilization of polyglycol ether for the manufacture of a membrane, in particular a gas separation membrane, wherein the membrane comprises a selective separating layer that is manufactured according to the present invention. To that end the previous description is expressly referred to.

Expediently, the use of a membrane according to the invention with a selective separating layer for separation of, preferably polar, gases, in particular carbon dioxide, from a gas mixture is intended. Hereby, the membrane is applied, for example, for the selective separation of carbon dioxide from gas flows such as, for example, a natural gas, bio-gas, flue gas or from gas mixtures that are utilized for the storage of groceries and/or plants.

In addition provision is made for a gas separating reactor with a membrane according to the present invention, in particular a gas separation membrane as well as a method for the operation of a gas separating reactor with a corresponding membrane according to the invention, wherein between the first and second side of the membrane a gas pressure difference is established.

DETAILED DESCRIPTION

In what follows the invention is described in an exemplary manner based on embodiment examples.

EXAMPLE 1

Manufacture of polymer membranes from polymer mixtures of Pebax® and polyethylene glycol dimethyl ethers (PEG-DME)

Polymer membranes were manufactured from several mixtures of Pebax® and polyethylene glycol dimethyl ethers (PEG-DME), wherein the relative weight ratios of both polymers were varied.

For example, a polymer membrane with a 50 wt % Pebax® and 50 wt % polyethylene glycol dimethyl ethers (PEG-DME) corresponding to 3 g Pebax® MH 1657 (ARKEMA) subject to reflux at 80° C. was dissolved in a mixture of 30 g water and 70 g ethanol. To the Pebax® polymer, 3 g of polyethylene glycol dimethyl ether (MW 250) was added. Subsequently, the polymer mixture was cast into a film and the solvent, namely the ethanol/water mixture, evaporated so that a selective separating layer was obtained.

By corresponding means additional polymer membranes with proportions of about 10 wt %, 20 wt %, 30 wt %, and 40 wt % polyethylene glycol-dimethyl ether in the initial polymer mixture were produced.

In table 3, the permeability coefficients, diffusion coefficients and solubility coefficients as well as the selectivity of Pebax® and its mixtures with polyethylene glycol dimethyl ether are indicated, wherein the values indicated are provided according to DME of the respective proportion in wt % of polyethylene-dimethyl ethers (PEG-DME) in the polymer mixtures. For comparison a known polymer membrane made from (pure) Pebax® is also listed in the table.

TABLE 3

$CO_2$ and $H_2$ permeabilities of Pebax ® and mixtures with PEG-dimethyl ethers

| Sample | $^aP$ $CO_2$ | $^bD$ $CO_2$ | $^cS$ $CO_2$ | α $CO_2/H_2$ | α $CO_2/N_2$ | α $CO_2/CH_4$ |
|---|---|---|---|---|---|---|
| Pebax ® | 78 | 0.49 | 1.6 | 9.1 | 45 | 15.6 |
| Pebax ®/PEG-DME10 | 123 | 0.68 | 1.8 | 10.8 | 45 | 15.0 |
| Pebax ®/PEG-DME20 | 206 | 1.16 | 1.8 | 11.8 | 45 | 14.7 |
| Pebax ®/PEG-DME30 | 300 | 1.43 | 2.1 | 13.6 | 45 | 14.7 |
| Pebax ®/PEG-DME40 | 440 | 1.80 | 2.4 | 14.2 | 42 | 13.8 |
| Pebax ®/PEG-DME50 | 606 | 2.29 | 2.6 | 15.1 | 43 | 13.2 |

$^a$Permeability coefficient P in Barrer
$^b$Diffusion coefficient D in [$10^{-6}$ (cm$^2$/s)]
$^c$Solubility coefficient S in [$10^{-2}$ cm$^3$ (STP)/(cm$^3$ s cmHg)]

From table 3 it can be discerned that the permeability of carbon dioxide increases with rising content of polyethylene glycol-dimethyl ether in the selective separating layer. The diffusion coefficient as well as the solubility coefficient increase with rising content of polyethylene glycol-dimethyl ether. Correspondingly, the selectivity of $CO_2$ relative to hydrogen also increases from 9.1 in the case of a polymer membrane (made of pure Pebax®) to 15.1 in the case of a mixture of Pebax®/polyethylene glycol dimethyl ether (PEGDME50) with 50% PEG-dimethyl ether.

EXAMPLE 2

Manufacture of polymer membranes from polymer mixtures of Pebax® and different etherified polyethylene glycols or polyethylene glycol ethers.

Polymer membranes from several mixtures of Pebax® and diverse, etherified polyethylene glycols or polyethylene glycol ethers, were manufactured, wherein the relative weight ratios of both polymers are respectively 50 wt %.

The polymer membranes with the selective separating layers were manufactured according to the method described in example 1.

For this purpose membranes were manufactured subject to the utilization of Pebax® and polyethylene as well as polyethylene glycol methyl ether (PEG-ME), polyethylene glycol-dimethyl ether (PEG-DME), polyethylene glycol-vinyl ether (PEG-VE), polyethylene glycol-divinyl ether (PEG-DVE), polyethylene glycol-allyl methyl ether (PEG-AME), polyethylene butyl ether (PEG-BE), as well as Genosorb (a mixture of PEG-dibutyl ethers with different molecular weights), wherein the proportion of the polyethylene glycol ether was respectively 50 wt %.

In table 4 the permeability coefficients, diffusion coefficients and solubility coefficients as well as the selectivity of Pebax® and its mixtures with polyethylene glycol dimethyl ether for carbon dioxide ($CO_2$) and hydrogen ($H_2$) are indicated. For comparison the corresponding coefficients for the polymer membranes made of Pebax® as well as Pebax® and polyethylene glycol are likewise indicated.

It can be discerned from table 4 that in the case of the polymer membranes on the basis of Pebax® or polyether-polyamide block copolymers and etherified polyethylene glycol the permeability for carbon dioxide relative to the known membranes made of Pebax® as well as Pebax®/PEG increases significantly. Correspondingly, the diffusion coefficients are in the case of the polymer membranes according to the invention also higher. In addition, the selectivity of carbon dioxide relative to hydrogen rises in the case of the polymer membranes according to the invention in comparison to the known membranes.

TABLE 4

$CO_2$ and $H_2$ permeabilities of Pebax ® and mixtures with PEG-ethers

| Sample | $^a$P $CO_2$ | $^b$D $CO_2$ | $^c$S $CO_2$ | $^b$D $H_2$ | $^c$S $H_2$ | α $CO_2/CH_4$ |
|---|---|---|---|---|---|---|
| Pebax ® | 78 | 0.49 | 1.6 | 3.2 | 0.027 | 9.1 |
| Pebax ®/PEG | 151 | 0.96 | 1.6 | 6.7 | 0.021 | 10.8 |
| Pebax ®/PEG-ME | 290 | 1.10 | 2.7 | 5.7 | 0.036 | 14.1 |
| Pebax ®/PEG-DME | 606 | 2.29 | 2.65 | 11.4 | 0.035 | 15.1 |
| Pebax ®/PEG-VE | 335 | 1.25 | 2.80 | 6.6 | 0.040 | 12.9 |
| Pebax ®/PEG-DVE | 570 | 2.87 | 1.98 | 13.9 | 0.032 | 12.9 |
| Pebax ®/PEG-AME | 620 | 2.32 | 2.68 | 12.0 | 0.037 | 14.5 |
| Pebax ®/PEG-DME | 650 | 2.33 | 2.81 | 9.5 | 0.046 | 14.9 |
| Pebax ®/PEG-BE | 225 | 1.60 | 1.40 | 9.0 | 0.022 | 11.4 |
| Pebax ®/Genosorb* | 520 | 2.97 | 1.75 | 9.6 | 0.042 | 13.0 |

$^a$Permeability coefficient P in Barrer;
$^b$Diffusion coefficient D in [$10^{-6}$ ($cm^2$/s)];
$^c$Solubility coefficient S in [$10^{-2}$ $cm^3$ (STP)/($cm^3$ s cmHg)]
ME = Methyl ether;
DME = Dimethyl ether;
VE = Vinyl ether;
DVE = Divinyl ether;
AME = Allyl methyl ether;
BE = Butyl ether
*mixtures of PEG-dibutyl ethers with different molecular weights

What is claimed is:

1. A method for the manufacture of a gas separation membrane, wherein the gas separation membrane comprises a selective separating layer, the method comprising the steps of:

a. a polymer solution is produced from at least one polyethylene glycol ether and at least one polyether block amide;
   b. the polymer solution is cast into a film; and
   c. drying the film to produce the selective separating layer.

2. A method according to claim 1, wherein the manufacture of the polymer solution is implemented in a solvent.

3. A method according to claim 1, wherein the polymer solution is produced in an ethanol/water mixture.

4. A method according to claim 1, wherein the polymer solution is produced at a temperature between 50° C. and 90° C.

5. A method according to claim 1, wherein as polyethylene glycol ether for the production of the polymer solution polyethylene glycol-methyl ether and/or -dimethyl ether and/or -vinyl ether and/or -divinyl ether and/or -allyl methyl ether and/or -butyl ether and/or -dibutyl ether or mixtures thereof are utilized.

6. A method according to claim 1, wherein the polyethylene glycol ether at a proportion of 5 wt % to 60 wt % is added to the polymer solution.

7. A method according to claim 1, wherein the film or the selective separating layer is applied onto a support.

8. A gas separation membrane, manufactured by the method of claim 1, wherein the selective separating layer consists of or is manufactured from a polyether block amide and at least one polyethylene glycol ether.

9. A membrane according to claim 8, wherein the at least one polyethylene glycol ether is at least one polyethylene glycol-methyl ether, a polyethylene glycol-dimethyl ether, a polyethylene glycol-vinyl ether, polyethylene glycol-divinyl ether, polyethylene glycol-allyl methyl ether, polyethylene-butyl ether, polyethylene glycol-dibutyl ether or mixtures thereof.

10. A membrane according to claim 8, wherein the proportion of the polyethylene glycol ether is between 5 wt % to 60 wt %.

11. A membrane according to claim 8, wherein the selective separating layer is deposited or is being deposited on a porous support.

12. A membrane according to claim 8 for the separation of carbon dioxide, from a gas mixture.

13. A gas separation reactor having a gas separation membrane, according to claim 8.

14. A method for the operation of a gas separation reactor according to claim 13, wherein between a first side and a second side of the membrane, a gas pressure difference is established.

15. A method according to claim 1, wherein the polyethylene glycol ether at a proportion of 50 wt % is added to the polymer solution.

16. A method according to claim 1, wherein the film or the selective separating layer is applied onto a porous support.

17. A membrane according to claim 8, wherein the proportion of the polyethylene glycol ether is 50 wt %.

* * * * *